Patented Oct. 14, 1947

2,429,102

UNITED STATES PATENT OFFICE 2,429,102

ESTERS OF LIGNIN MATERIAL

Harry F. Lewis and Friedrich E. Brauns, Appleton, Wis., assignors, by mesne assignments, to The Mead Corporation, Chillicothe, Ohio, a corporation of Ohio No Drawing. Application February 13, 1943, Serial No. 475,790

4 Claims. (Cl. 260—124)

This invention relates to lignin products and more particularly to the organic esters of lignin.

It is the principal object of the invention to provide new products adapted for use in molding which have predetermined characteristics of melting point, solubility and compatibility with the constituents of a plastic molding composition, such that they exhibit highly desirable properties as an internal mold lubricant for facilitating the removal of the molded piece from the mold.

It is a further object to provide an ester product of lignin material and the aliphatic carboxylic acids which product has desirable properties for use in molding and the like.

It is a further object to provide a simple and highly satisfactory process for producing ester reaction products of lignin material and organic acids which are compatible with plastic molding compositions, of predetermined melting point and solubility characteristics, and useful for various purposes.

It is a still further object to provide an inexpensive and rapid process for obtaining such materials commercially in a relatively purified form.

Other objects and advantages will be apparent from the following description and the appended claims.

In the pulping of wood to recover the cellulose for the paper industry, lignin material derived from the native lignin of the wood forms the principal organic constituent of the spent digestion liquors which are produced in such pulping operations, and there is available a large and practically inexhaustible source of this lignin material. In spite of extensive work toward the utilization of this lignin material the great bulk of such spent digestion liquors are not treated for recovery of the lignin material which is ordinarily destroyed. It thus represents a commercially desirable material from which to make products, where those products are formed to possess properties which make them suitable and desirable for industrial purposes.

The chemical nature of the lignin material as recovered from spent digestion liquors is probably not identical with the composition of the lignin as it initially exists in the original wood, and the exact chemical composition of neither native lignin nor the derived lignin material has so far been fully determined. As a result of extensive work with the recovered lignin material it has, however, been determined that such lignin material behaves as a definite chemical compound, and has been found to act as if it were formed of what may be termed building units, each comprising a similar grouping of elements, with the units being associated with each other in a predetermined manner. The separate building units are characterized by being formed with a central core or nucleus, the composition of which is not entirely known, and which has associated with it probably around its outer portion a definite number of characteristic groups which have been identified. Thus the unit is known to contain methoxyl groups the number of which varies with hard and soft woods but which in each case is a definite number. These groups are known to be relatively stable and such as to be carried through various reactions without change, thus serving as a means of determining the extent of chemical change or modification undergone by the product. The lignin building unit is also characterized by the presence of five hydroxyl groups, and such groups may likewise be reacted, certain of such groups apparently being more acid than the rest and accordingly being more reactive.

In accordance with the present invention, such lignin material is subjected to a condensation reaction with a derivative of an organic acid, i. e., the halide or the anhydride thereof under predetermined controlled conditions such that the corresponding ester of the acid is formed. The reactive hydroxyl groups of the lignin unit enter into a reaction with a monobasic organic acid without affecting the remainder of the unit and without the linking together of the units into long chains, and there is thus attained a true condensation or esterification of the lignin unit with the organic acid. Such ester products have been produced from the anhydrides and halides of monobasic aliphatic carboxylic acids, both saturated and unsaturated. The resulting products are of resinous nature and vary in their characteristics over a wide range of melting points, solubility, and the like. Thus with organic acids of lower molecular weight, the characteristics of the product more nearly approach those of the lign... material itself. As a series of organic acid esters of an homologous series of acids are prepared, it is found that the melting point characteristics progressively change in a definite pattern, the melting point being decreased in a regular manner with increase in the number of carbon atoms in the acid up to a definite minimum point, beyond which, as the molecular weight of the acid itself increases, the melting points also increase, the product with the higher molecular weight acids assuming more of the characteristics of the acids themselves.

As resinous products, the esters of the lignin material have a wide range of usefulness. As specific examples, they are of great value in the field of plastics and in molding. They are thermoplastic in nature and may be used alone or with other thermoplastic materials in the making of thermoplastic molded products. They may also be used and are generally compatible with thermosetting resins, being usable for the purpose of extending thermosetting resins such as phenol formaldehyde resins, and resulting in the production of satisfactory thermosetting molded products. They are also useful in the manufacture of printing inks where the solubility of the resin is of importance in securing control of the viscosity of the ink. They are likewise usable in the preparation and formulation of film forming materials such as inks and enamels, where the solubility and melting point are important in the preparation and application or use thereof.

The lignin ester materials are especially useful in molding operations which include woody fibers, wood flour, plastic molding compositions derived largely from wood raw materials or other wood material. Apparently the lignin portion of the molecule imparts desirable characteristics to the products in the presence of such woody material, and the products have been found to be useful not only as resinous binders, but as plasticizers and as internal mold lubricants since they appear to impart desirable flow characteristics to the molding composition when in the mold without adversely affecting the strength of the molded product. Further, they permit removal of the molded piece without encountering the common difficulties of having the piece stick in the mold or be deformed in removal therefrom.

It will be understood that in the use of such lignin ester products, the selection of the acid derivative with which the lignin material is condensed and esterified is determined largely with relation to the melting point and solubility and other characteristics which are desired for the product. By suitably selecting the acid derivative, the product can be made to have a desired melting point and solubility, the melting point being selected to have a proper relation to the melting point characteristics of the other constituents which are used in the molding composition. In this way the various ingredients of the composition are made to flux and flow smoothly and homogeneously resulting in a molded product of maximum strength and uniformity. Predetermination of melting point characteristics is similarly important in connection with the use of the resinous materials in printing inks, in enamels, in film forming compositions, and in other uses. And it will thus be clear that in preparing any particular molding compound an organic acid compound will be utilized which is known to result in the production of a resin having the chemical and physical characteristics desired for that particular purpose.

In the production of the organic acid esters of the lignin material, it is important to carry out the reaction in the absence of moisture and under anhydrous conditions. The lignin material preferably used is obtained in the form of a powdered mass having a melting point of about 210° C., this material being first carefully dried to remove all moisture therefrom, the drying being carried out under suitable conditions which will avoid the fluxing or melting of the lignin. It is then brought into solution in a suitable dry organic solvent such as dioxan or pyridine, the former being entirely satisfactory for its solvent action and being utilized in preference to pyridine because of its greater availability, sufficient pyridine being present however to serve as the scavenging agent as described below. In place of pyridine other suitable primary, secondary or tertiary organic bases, such as aniline or mono-, di-, or tri-methyl amine, may be used.

Thereafter the lignin material in solution is subjected to reaction with the selected organic acid derivative under such conditions that a condensation reaction will occur with the formation of the resulting ester.

According to one procedure, an acid derivative is used which will not result in the splitting off of molecules of water and which will thus allow the reaction to proceed under the desired anhydrous conditions. In this procedure the acid halides of the organic acids are used, the acid chlorides being preferred because of their more ready availability.

In the condensation reaction between the lignin material and the acid halides, the ester of the lignin material is formed and there is also the resulting production of an acid through the combination of the hydrogen and the halide. If this acid is not removed, the acidity of the reaction may build up and result in checking the progress of the reaction and prevent it from going to completion. In order therefore to neutralize the resulting acidity, an organic base is added in sufficient quantity as required for the scavenging of the formed acid. A satisfactory material for this purpose is pyridine which reacts to form the acid salt of pyridine, for example pyridine hydrochloride, and which can be readily treated in order to recover the pyridine for reuse. Other suitable organic bases may likewise be used.

The general reaction making use of the acid halide of the organic acid may be represented in accordance with the following equation in which the lignin nucleus is represented by the symbol M. For purposes of simplicity, only one hydroxyl group is represented, it being understood however that the same reaction may occur upon one or more of the available hydroxyl groups up to the entire number thereof:

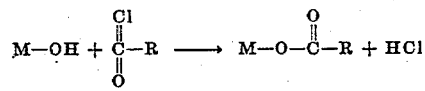

where R is an aliphatic radical possessing either straight or branch chains.

According to another procedure, the lignin material in solution is reacted with an excess of the acid anhydride in the presence of a suitable organic base such as pyridine. The condensation reaction results in the splitting off of water which is immediately reacted with the excess of the anhydride to form the corresponding acid. The pyridine serves not only as a solvent but also provides for continuously reacting with and neutralizing the free acid so formed and thereby permitting the reaction to proceed to completion under the desired anhydrous conditions. This reaction proceeds readily and in some cases is exothermic so that the reacting materials should be added slowly; in other cases heat may be added in order to force the reaction to proceed to completion. This reaction may be represented by the folowing equation:

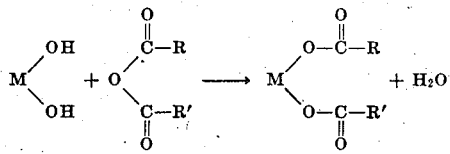

where R and R' are any aliphatic radicals.

It will be seen from the above that the anhydride group has reacted with two of the hydroxyl groups attached to the lignin unit. The remaining hydroxyl groups can also react similarly with additional molecules of the acid anhydride, to form compounds with varying degrees of esterification. It will be noted that in the equation shown immediately above the anhydride is a mixed anhydride which yields a corresponding mixed ester. A similar mixed ester product can also be obtained by partial esterification with an acid halide followed by a second esterification step with a different acid halide.

In the preparation of a material for use in molding as an internal mold lubricant, it is important to provide a material which is first of all compatible with the remaining constituents of the composition and of proper correlated melting point therewith to avoid objectionable stratification and separation during the flowing process which takes place in the mold and to avoid interfacial boundaries between the binder ingredients and the lubricant, since such boundaries may give rise to planes of weakness and hence result in material reduction in the strength of the finished article. The lubrication material should further be of such character as to eliminate any serious tendency toward tackiness, or adhering condition as between the molded piece and the mold itself. Also the lubricant should be such as not to enter into a reaction with the material of the mold itself. Very satisfactory results in the making of such material have been secured where the acid derivative utilized was one having such number of carbon atoms and hence such predominating influence upon the properties of the formed product as to produce the characteristics desired. Thus with an acid derivative having less than about 12 carbon atoms, the characteristics of the lignin material are more dominant; above about 12 carbon atoms, the product takes on more of the characteristics of a fatty or greasy material and thus becomes highly satisfactory for use as an internal mold lubricant. For instance, satisfactory products have been obtained by using a lauric acid derivative, and a specially desirable product secured by using a derivative of palmitic or stearic acid. Other acid derivatives of an intermediate or a greater number of carbon atoms may likewise be used, such products having a range of melting point and other characteristics which usually determine the particular material to be selected for each specific case.

The following is given as a specific example of the use of an acid anhydride in the preparation of the corresponding ester. The lignin material was first thoroughly dried and 25 grams were dissolved in 110 cc. of freshly dried pyridine. The lignin material dissolved rapidly with little evolution of heat and gave a dark reddish-brown solution. To this solution 50 c. c. of acetic anhydride were added. After shaking for several minutes, the mixture became slightly warmer and gradually became more and more viscous until, after ten minutes the entire mass became gelatinous. The mixture was then heated for 35 minutes to about 60° C. whereupon it became more fluid although the gel did not disappear entirely. After standing for 4 hours at room temperature it was poured with rigorous stirring into 4 liters of distilled water containing 100 c. c. of 36% hydrochloric acid and broken ice to prevent excessive generation of heat.

The acetylated lignin material immediately separated as a gray-brown flocculent precipitate which settled rapidly. After stirring the suspension for 10 to 20 minutes, the supernatant colorless liquid was filtered off and the product was subjected to further purification and finally dried.

The yield of acetylated lignin was 30.5 grams or 122%. The methoxyl content was 17.6%, showing a decrease from the methoxyl content of the lignin material itself which is 21.6%. This corresponds to an increase in molecular weight of 22% agreeing with the increase in yield of a like amount. The melting point of the product was 145° C.

The following is a specific example utilizing the acid halide procedure, and starting with the acid chloride of caproic acid. Thirty parts of lignin material having a methoxyl content of 21.5% and previously dried were dissolved in 72 parts of dry pyridine and cooled in an ice bath. Twenty-five parts of caproyl chloride (C₅H₁₁COCl)

were added in small portions with continuous shaking and cooling. The mixture became warm, indicating a chemical reaction, and after all of the chloride had been added, the mixture was warmed at 60° to 70° C. for 30 minutes and allowed to stand over night at room temperature to insure completion of the reaction. It was then poured into a large excess of distilled water containing 75 parts of concentrated hydrochloric acid whereupon the lignin caproate separated. At first it was a somewhat sticky or gummy product but, after stirring for about 15 minutes, it became solid and more or less powdery. It was filtered and ground with water giving a fine suspension, being then filtered and again washed with water. The yield was 49 parts. The product was a light brown powder soluble in ether but insoluble in petroleum ether. Its melting point was 100° C. and the methoxyl content was 13.5%. The decrease of the methoxyl content from 21.5% for the original lignin material corresponds to an increase in molecular weight of 60%, this increase being in close agreement with the yield secured and indicating the entrance of five caproyl groups. The compound thus is indicated to be lignin pentacaproate.

Similar treatment using lauroyl chloride resulted in the production of lignin laureate as a tough, sticky resin with a dark brown color and a bluish green fluorescence. The resin as initially produced remained tacky over a period of months; after being purified it was no longer tacky and was soluble in ether and in low boiling petroleum ether. The melting point was 75° C. and the yield was quantitative.

By following the procedure above described and reacting lignin material with stearoyl chloride, a product was secured which was purified by first washing in ether solution with water and then twice with 10% sodium hydroxide solution and again with water. Under this procedure hydrolysis of two of the five stearoyl groups apparently took place with the production of a product in which the methoxyl content was 11.37%, indicating the formation of lignin tristearate.

The following is an example of a simplified and semi-commercial process for the production of lignin stearate. Eighty parts of dry lignin material were added to a mixture of sixty parts by weight of dry pyridine and two hundred parts of dioxan. One hundred sixty parts by weight of stearoyl chloride were added slowly to the mixture. The temperature rose considerably and when the addition of the stearoyl chloride was almost completed, the solution became very viscous and yielded a spongy, rubberlike mass. By allowing the temperature to rise as a result of the heat of reaction, or by external application of heat if required, the mass is heated above its gel point, and in this condition remains fluid and capable of being more readily handled.

The mass thus obtained is then washed with water in order to remove any remaining pyridine and the reaction products thereof, as well as the dioxan. This is accomplished by adding the above material while still hot to a large quantity of cold water and vigorously stirring the same, this action causing the gelation of the mass while at the same time it is broken up into small particles by the agitation. The wash water is then removed by decanting and the particles transferred into a pebble mill. A suitable mill may be half filled with stones of about one-half to one and one-half inches in diameter, and operated at about 50 R. P. M., the mill being practically filled with water. After a period of some two to three hours the material is well dispersed and the particles are capable of remaining in suspension. The suspension is then filtered and additionally washed with water to remove remaining impurities leaving a substantially pure product. Thereafter the product is air dried at a temperature below its melting or fusing temperature.

Such lignin pentastearate was found to have especially desirable properties as an internal mold lubricant since it was found that it could be added to the mold powder for improving the flow of the material when in the mold while maintaining the desired strength of the molded resin, and at the time aiding in freeing the piece from the mold without sticking. For example, the use of 2 to 2.25% of the lignin stearate in the molding powder gave very satisfactory results, permitting the removal of the molded product from the mold without difficulty, the product being handled in the mold without the use of the usual zinc stearate lubricant. While the commonly used metallic soaps such as zinc stearate serves the purpose of a mold lubricant, it has the additional undesirable effect of adversely affecting the strength of the molded product, probably because of its incompatibility with the woody material in the molding composition. As mentioned above the lignin stearate has desirable properties of compatibility with the wood composition used in the molding operation and appeared to flow and mix homogeneously and uniformly therewith and does not detract from the strength of the molded product. Very satisfactory results have been obtained in the use of such material as above described in the molding of wood fibres such as redwood plastic pulp, both alone and with the addition of resins, modifying agents and the like, producing both thermoplastic and thermosetting compositions, the molding being carried out for example at a temperature of 150° C. and pressures of the order of 1500 to 2000 pounds per square inch.

As an example of the preparation of an organic acid ester from an unsaturated acid, oleic acid chloride was first prepared and reacted with lignin material in the manner above described. The product so obtained was a dark brown mass but had a greasy appearance and could be ground only with difficulty. Analysis showed it to contain 8.45% methoxyl, indicating that it was lignin pentaoleate. Its melting point was between 200 and 210° C.

For ordinary commercial purposes the procedures above described are usually found to result in products of a sufficient degree of purity. However, where a more highly purified product, one susbtantially free of the products of pyridine, dioxan and other impurities, is desired, the following additional procedures may be followed, depending upon the particular characteristics of the product, as to its melting point, solubility and other physical characteristics.

In general the procedure followed for effecting such further purification is to first prepare a solution of the crude lignin ester product obtained as above, in a suitable solvent. Such solution is then added slowly to a second selected solvent of different characteristics in which the lignin ester material is insoluble, but which is a solvent for the first mentioned solvent and the impurities. In this way the purified lignin ester material is precipitated and may be filtered and dried to provide such material in a highly purified form.

As an example of the carrying out of the additional purification process upon an ester produced from lignin material and the derivative of myristic acid, the crude product was first dissolved in ether, and this solution was precipitated by pouring into absolute methanol; the insoluble lignin ester was separated and then dissolved in dioxan and the purified lignin ester precipitated when the dioxan solution was poured into water.

Methoxyl content determinations of the lignin ester materials purified in accordance with the above procedure have indicated that the material has been changed from a penta to a tetra ester, this change probably occurring as a result of the more acidic nature of one of the hydroxyl groups allowing the saponification of one acid group.

The following table sets forth data with respect to lignin ester materials prepared from derivatives of a representative number of aliphatic carboxylic acids comprising varying numbers of carbon atoms, the table showing the adverse melting point and solubility characteristics of each of the materials in relation to the corresponding acid.

| Acid Group | Number Carbon Atoms | Yield, Per Cent | | Melting Point | | Methoxyl, Per Cent | | Solubility in— | | | | | | | | |
|---|---|---|---|---|---|---|---|---|---|---|---|---|---|---|---|---|
| | | Crude | Pure | Crude | Pure | Crude | Pure | Methyl Alcohol | 95% Ethyl Alcohol | Acetone | Chloroform | Ether | Dioxane | Benzene | Pet. Ether | Ethyl Acetate |
| Acetate | 2 | 100 | 98 | 190 | 191–201 | 17.6 | ----- | 1 | 1 | 3 | 3 | 0 | 3 | 2 | 0 | 3 |
| Proprioate | 3 | 98 | 96 | 155 | 183–93 | 15.9 | ----- | 1 | 1 | 3 | 3 | 0 | 3 | 3 | 0 | 3 |
| N-Butyrate | 4 | 92 | 96 | 125–30 | 124–9 | 16.1 | 16.2 | 1 | 1 | 3 | 3 | 1 | 3 | 3 | 0 | 3 |
| i-Butyrate | 4 | 95 | 92 | 147–50 | 152–62 | 15.6 | 16.1 | 1 | 1 | 3 | 3 | 1 | 3 | 3 | 0 | 3 |
| N-Valerate | 5 | 97 | 94 | 132–46 | 140–155 | 14.9 | ----- | 1 | 1 | 3 | 3 | 1 | 3 | 3 | 0 | 3 |
| i-Valerate | 5 | 97 | 96 | 135–40 | 130–140 | 14.5 | 14.8 | 1 | 1 | 3 | 3 | 1 | 3 | 2 | 0 | 3 |
| N-Caproate | 6 | 98 | 96 | 100 | 135–140 | 13.5 | ----- | 0 | 0 | 3 | 3 | 2 | 3 | 2 | 0 | 3 |
| i-Caproate | 6 | 92 | 90 | 120–125 | 130–145 | 14.5 | 14.8 | 1 | 1 | 3 | 3 | 2 | 3 | 3 | 0 | 3 |
| Heptate | 7 | 100 | 89 | 105 | 120–35 | 13.3 | ----- | 0 | 0–1 | 3 | 3 | 2–3 | 3 | 3 | 0–1 | ----- |
| Decanate | 10 | 97 | 40 | 35–42 | 80–95 | 11.0 | 12.5 | 0–1 | 0 | ----- | ----- | 2 | 3 | ----- | 0–1 | ----- |
| Undecanate | 11 | 100 | 78 | 75–85 | 80–110 | 11.0 | ----- | 0 | 0 | 3 | 3 | 2 | 3 | 2–3 | 0–1 | 3 |
| Laurate | 12 | 100 | 54 | 39–42 | 60–85 | 9.7 | 11.6 | 0 | 0 | 3 | ----- | 2–3 | 3 | 2–3 | 1 | ----- |
| Tridecanate | 13 | ----- | 91 | ----- | 65–70 | 10.5 | ----- | 0 | 0 | 3 | ----- | 2 | ----- | 2–3 | 2–3 | ----- |
| Myristate | 14 | 99 | 64 | 44–9 | 100–8 | 8.7 | 11.2 | 0–1 | 0–1 | 3 | 3 | 3 | 3 | 3 | 2–3 | 3 |
| Palmitate | 16 | ----- | 46 | 53–7 | 90–105 | 8.0 | 11.4 | 1 | 1 | ----- | ----- | 3 | 3 | 3 | 1 | 3 |
| Stearate | 18 | ----- | 84 | ----- | ----- | 6.91 | 11.4 | ----- | ----- | ----- | ----- | 3 | ----- | ----- | 2–3 | ----- |
| Oleate | 18 | ----- | ----- | ----- | 200–210 | 8.45 | ----- | ----- | ----- | ----- | ----- | ----- | ----- | ----- | 2–3 | ----- |

0 = Insoluble.
1 = Sl. soluble (less than 5%).
2 = Soluble to 50%.
3 = Miscible.

For the commercial production of a mold lubricant material, it has been found that a very satisfactory source of a group of acid halides is the by-product fatty acids obtainable from animal fats such as lard or tallow, as available in large quantities in packing house operations. In this case the halides are prepared from the mixed fatty acids obtained after the removal of glycerine from such fats, this operation leaving a mixture made up primarily of stearic, palmitic and oleic acids. Such mixed acids may then be reacted to form the corresponding halides in a convenient and well known manner, thereby affording a source of satisfactory material of the proper character and with the proper number of carbon atoms in the acid chain to result in the production of a desired lignin ester material or materials having the properties described above for use as a mold lubricant. As another commercially available source of suitable material, though of somewhat shorter length of chain, cocoanut oil made up partially of lauric and myristic acids may be similarly utilized.

In each of the above examples, the lignin material described was derived directly from black liquor such as the liquor resulting from the soda pulping process. It was produced in accordance with the process disclosed in Reboulet Patent No. 2,228,976, assigned to the same assignee as this application, this process resulting in the production of a highly satisfactory lignin material from black liquor. Where it is desired to use lignin material resulting from the acid or sulphite pulping process, such lignin must be first suitably processed to remove the sulfonic acid compounds, and to convert such lignin into a form comparable with that secured in the manner above described.

While the process and product herein described constitute preferred embodiments of the invention, it is to be understood that the invention is not limited to this precise process and product, and that changes may be made therein without departing from the scope of the invention which is defined in the appended claims.

What is claimed is:

1. New resinous products adapted for use as mold lubricants and the like essentially consisting of monobasic aliphatic carboxylic acid esters of the lignin material formed by reduction of the pH of the black liquor of a soda cook of woody matter to the range between about 7.8 and 9, said aliphatic ester radicals having at least 12 carbon atoms.

2. The product of claim 1 in which the lignin material used therein has a melting point of about 210° C.

3. The product of claim 1 which contains the stearic radical.

4. The product of claim 1 in which said aliphatic radicals are a mixture of acyl radicals derived from the mixed fatty acid esters in animal fat.

HARRY F. LEWIS.
FRIEDRICH E. BRAUNS.

REFERENCES CITED

The following references are of record in the file of this patent:

UNITED STATES PATENTS

| Number | Name | Date |
|---|---|---|
| 2,228,976 | Reboulet | Jan. 14, 1941 |
| 2,156,160 | Olson et al. | Apr. 25, 1939 |
| 2,099,717 | Alles | Nov. 23, 1937 |
| 2,209,289 | Wallace | July 23, 1940 |
| 1,922,690 | Tougovaz | Aug. 15, 1933 |
| 2,265,181 | Martin | Dec. 9, 1941 |

OTHER REFERENCES

Heuser et al., Cellulosechemie, vol. 5, pp. 13–21 (1924).

Sarkar, Chem. Absts., vol. 30, p. 479 (1936).

Certificate of Correction

Patent No. 2,429,102.                                         October 14, 1947.

HARRY F. LEWIS ET AL.

It is hereby certified that errors appear in the printed specification of the above numbered patent requiring correction as follows: Column 1, line 2, after "organic" insert *acid*; column 9, in the table, first column thereof, third word from the bottom, for "Pamitate" read *Palmitate*; and that the said Letters Patent should be read with these corrections therein that the same may conform to the record of the case in the Patent Office.

Signed and sealed this 20th day of January, A. D. 1948.

[SEAL]

THOMAS F. MURPHY,
*Assistant Commissioner of Patents.*